United States Patent
Ozawa

(10) Patent No.: US 6,505,304 B1
(45) Date of Patent: Jan. 7, 2003

(54) TIMER APPARATUS WHICH CAN SIMULTANEOUSLY CONTROL A PLURALITY OF TIMERS

(75) Inventor: Kazumasa Ozawa, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/330,051

(22) Filed: Jun. 11, 1999

(30) Foreign Application Priority Data

Jul. 22, 1998 (JP) .......................................... 10-206070

(51) Int. Cl.⁷ ................................................ G06F 1/04
(52) U.S. Cl. ...................... 713/600; 713/400; 713/500; 710/61
(58) Field of Search ................................ 713/400, 500, 713/502, 600, 601; 710/25, 58, 61, 59, 60; 712/208

(56) References Cited

U.S. PATENT DOCUMENTS

| | | | | |
|---|---|---|---|---|
| 4,542,351 A | * | 9/1985 | Okada .......................... | 331/11 |
| 4,862,369 A | * | 8/1989 | Yakuwa et al. ............... | 701/102 |
| 5,367,149 A | * | 11/1994 | Takahira ....................... | 235/380 |
| 5,687,389 A | * | 11/1997 | Packer ........................... | 710/5 |
| 5,724,260 A | * | 3/1998 | Klein ........................... | 364/550 |
| 5,986,591 A | * | 11/1999 | Willems et al. ................ | 341/79 |
| 6,075,690 A | * | 6/2000 | Hormuth et al. ............. | 361/166 |

* cited by examiner

Primary Examiner—Jeffrey Gaffin
Assistant Examiner—Rijue Mai
(74) Attorney, Agent, or Firm—Rabin & Berdo, P.C.

(57) ABSTRACT

A timer apparatus which can simultaneously control the operations of a plurality of timers without adjusting the operation of a counter of each timer in a software manner is provided. The same address information is added to an operation command to the counter of each timer (20, 30, 40, ... , 90), so the operation commands to the counters are simultaneously written into registers synchronously with a clock. Thus, the timing to start or stop the operations of the counters of the timers (20, 30, 40, ... , 90) can be made to coincide.

18 Claims, 5 Drawing Sheets

FIG. 2A

VARIOUS OPERATION COMMANDS TO TIMER

OPERATION COMMAND TO COUNTER

| ADDRESS INFORMATION | BIT7 | BIT6 | BIT5 | BIT4 | BIT3 | BIT2 | BIT1 | BIT0 |
|---|---|---|---|---|---|---|---|---|
| 0010 | | | | | RUN/STOP | | | |
| 0011 | | | | | RUN/STOP | | | |
| 0012 | | | | | RUN/STOP | | | |
| 0013 | | | | | RUN/STOP | | | |

TIMER 20:
TIMER 30:
TIMER 40:
TIMER 50:
· · ·
TIMER 90:

FIG. 2B

OPERATION COMMAND TO EACH COUNTER

| ADDRESS INFORMATION | BIT7 | BIT6 | BIT5 | BIT4 | BIT3 | BIT2 | BIT1 | BIT0 |
|---|---|---|---|---|---|---|---|---|
| 001F | TM90 RUN/STOP | TM80 RUN/STOP | TM70 RUN/STOP | TM60 RUN/STOP | TM50 RUN/STOP | TM40 RUN/STOP | TM30 RUN/STOP | TM20 RUN/STOP |

TIMER 20: ~
TIMER 90:

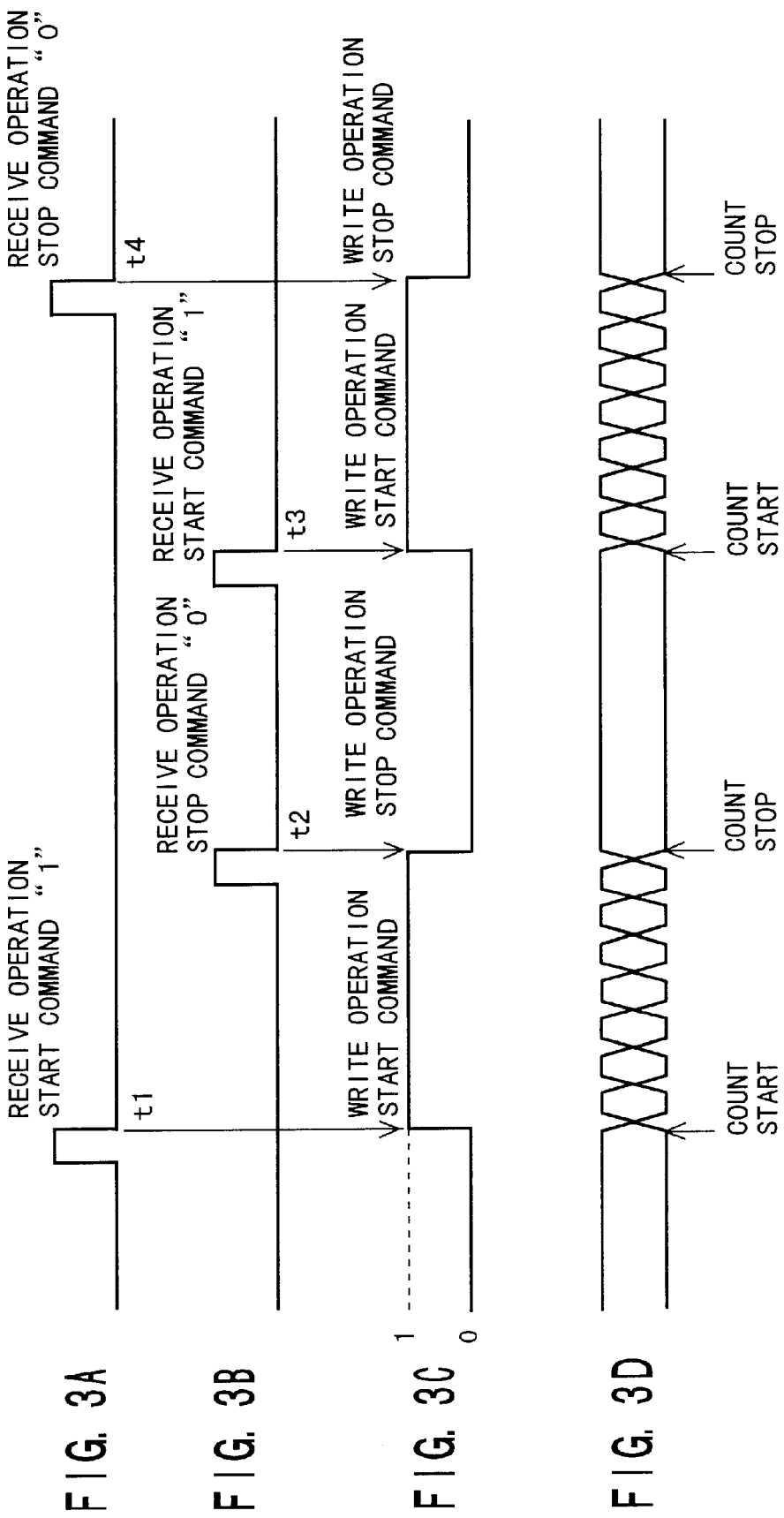

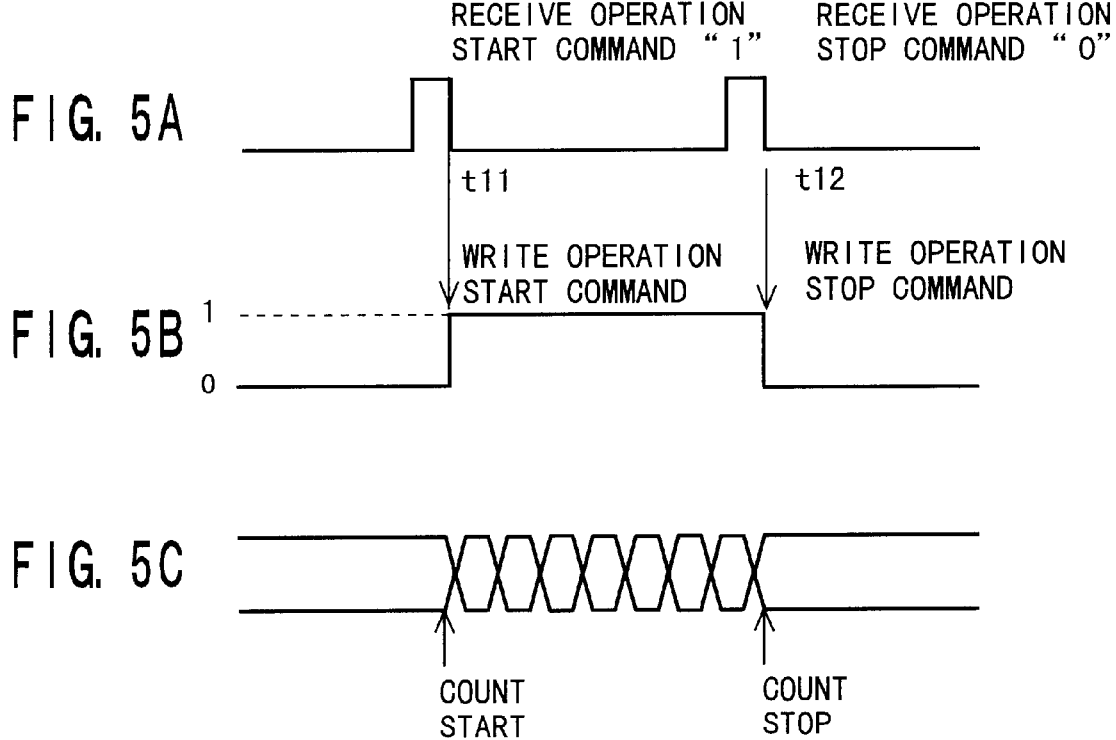

TIMER APPARATUS WHICH CAN SIMULTANEOUSLY CONTROL A PLURALITY OF TIMERS

BACKGROUND OF THE INVENTION

1. Field of the Invention

The invention relates to a timer apparatus which is built in, for example, a microcomputer in order to control the operation of the microcomputer and, more particularly, to a timer apparatus constructed by a plurality of timers.

2. Related Background Art

There is a case where a microcomputer uses a timer apparatus comprising a plurality of timers in order to control a plurality of operating times.

Each timer of the timer apparatus has a counter and a register provided in correspondence to the counter. An operation command showing the start or stop of the operation of the counter is written into the register of each timer. The operation command to the counter is written into the register, so that the operation of the counter is controlled. The operation control of the counter results in the operation control of the timer.

A different address for each timer is previously allocated to each timer provided with the register. Address information about the address allocated to the timer including the register corresponding to the counter is given to the operation command to the counter.

The operation command to each counter is sequentially written into the register of the timer to which the address corresponding to the address information has been allocated on the basis of the address information synchronously with a clock as a reference signal of the operation of the microcomputer, so that the operation of each timer is controlled.

As mentioned above, in the conventional timer apparatus, since the addresses which are allocated to the operation commands to the counters are mutually different for every timer, the operation command to each counter is sequentially written into the register synchronously with the clock.

If the operation commands to the counters can be simultaneously written into the registers, the timers can be simultaneously made operative. In the conventional timer apparatus, however, since an address is allocated to every timer and the address information of each timer is allocated to the operation command to the counter of each timer as mentioned above, a difference occurs among the times when the operation command to the counter of each timer is written into each register. Consequently, the operation commands to the counters of the timers cannot be simultaneously written into the registers.

In the conventional timer apparatus, therefore, even when the user wants to simultaneously control the operations of a plurality of timers, a deviation corresponding to at least a period of the clock occurs in the start timing of the operation control of each timer.

Because of the above reason, in the conventional timer apparatus, the operations of a plurality of timers cannot be simultaneously controlled, for example, without adjusting the operation of the counter of each timer in a software manner. There is, consequently, a problem such that it is troublesome to simultaneously control the operations of a plurality of timers.

SUMMARY OF THE INVENTION

It is, therefore, an object of the invention to provide a timer apparatus which can simultaneously control the operations of a plurality of timers without adjusting the operation of a counter of each timer in a software manner.

According to an aspect of the invention, the above object is accomplished by a timer apparatus comprising: a plurality of counters; a register, provided in correspondence to each of the counters, for writing an operation command to each of the counters; and a distribution writing circuit for simultaneously writing each of said operation commands at bit positions corresponding to said counters of a bit train into each of said registers corresponding to each of said counters in order to control an operation of each of said counters when receiving said bit train which consists of a plurality of continuous bits to which one address information has been added and in which each of said bits indicates the operation command to said counter corresponding to each of the bit position.

In the timer apparatus according to the invention, each bit of the bit train consisting of a plurality of continuous bits added with one address indicates the operation command to the counter corresponding to each bit position. When the bit train is received, the distribution writing circuit simultaneously writes each bit of the bit train, namely, the operation commands to the counters into the registers corresponding to the counters. Thus, the operation control of each counter, namely, the operation control of each timer is simultaneously executed.

In the timer apparatus according to the invention, since the same address information is allocated to the operation command to each counter as mentioned above, the operation command to each counter is simultaneously written into each register synchronously with the clock. Thus, the start timings of the operation control to the counters, namely, the start or stop timings for the operations of the counters can be made coincide.

In the timer apparatus according to the invention, therefore, the operations of a plurality of timers can be simultaneously controlled without adjusting the operation of the counter of each timer in a software manner.

According to the timer apparatus of the invention, therefore, the operations of a plurality of timers can be relatively easily simultaneously controlled.

Further, there is provided a decoder to which an address corresponding to the address information is allocated and which transmits a decoding signal to the distribution writing circuit so as to give a write permission to the register to the distribution writing circuit when the address information corresponding to the address is received.

The register can be constructed by a flip-flop for, when a predetermined input signal is received at one of input terminals, outputting an input signal which is inputted to the other input terminal to the counter.

A bit selecting circuit, provided in correspondence to each of the counters, for outputting the bit signal to the other input terminal of the counter when the bit corresponding to the counter of the bit train is received can be also provided for the distribution writing circuit.

Further, a writing circuit, provided for each counter, for writing the bit outputted from the bit selecting circuit into the register of the counter corresponding to the bit can be also provided for the distribution writing circuit.

Each of the writing circuits simultaneously outputs an operation signal to each register so as to enable the bit which is outputted from the bit selecting circuit to be simultaneously written into each register.

The distribution writing circuit can be constructed by: a decoder to which an address corresponding to the address information is allocated and which transmits a decoding signal to give a write permission to the register to each register when the address information corresponding to the address is received; and a data bus comprising data lines which are provided in correspondence to the respective bits of the bit train and are used to transmit the bit signal of the bit position of the bit train corresponding to each counter to each corresponding counter, so that the command is written into each register by a synchronous input of the decoding signal from the decoder and the bit signal from the data line.

The above and other objects and features of the present invention will become apparent from the following detailed description and the appended claims with reference to the accompanying drawings.

BRIEF DESCRIPTION OF THE DRAWINGS

FIGS. 2A and 2B are explanatory diagrams of an operation command to each counter;

FIGS. 3A to 3D are timing charts for a certain timer operation control of the timer apparatus of the embodiment 1;

FIGS. 5A to 5C are timing charts for a timer operation control of the timer apparatus of the embodiment 2.

DETAILED DESCRIPTION OF THE PREFERRED EMBODIMENTS

The invention will now be specifically explained hereinbelow with respect to the embodiments.

Embodiment 1

<Construction>

Figure 1:
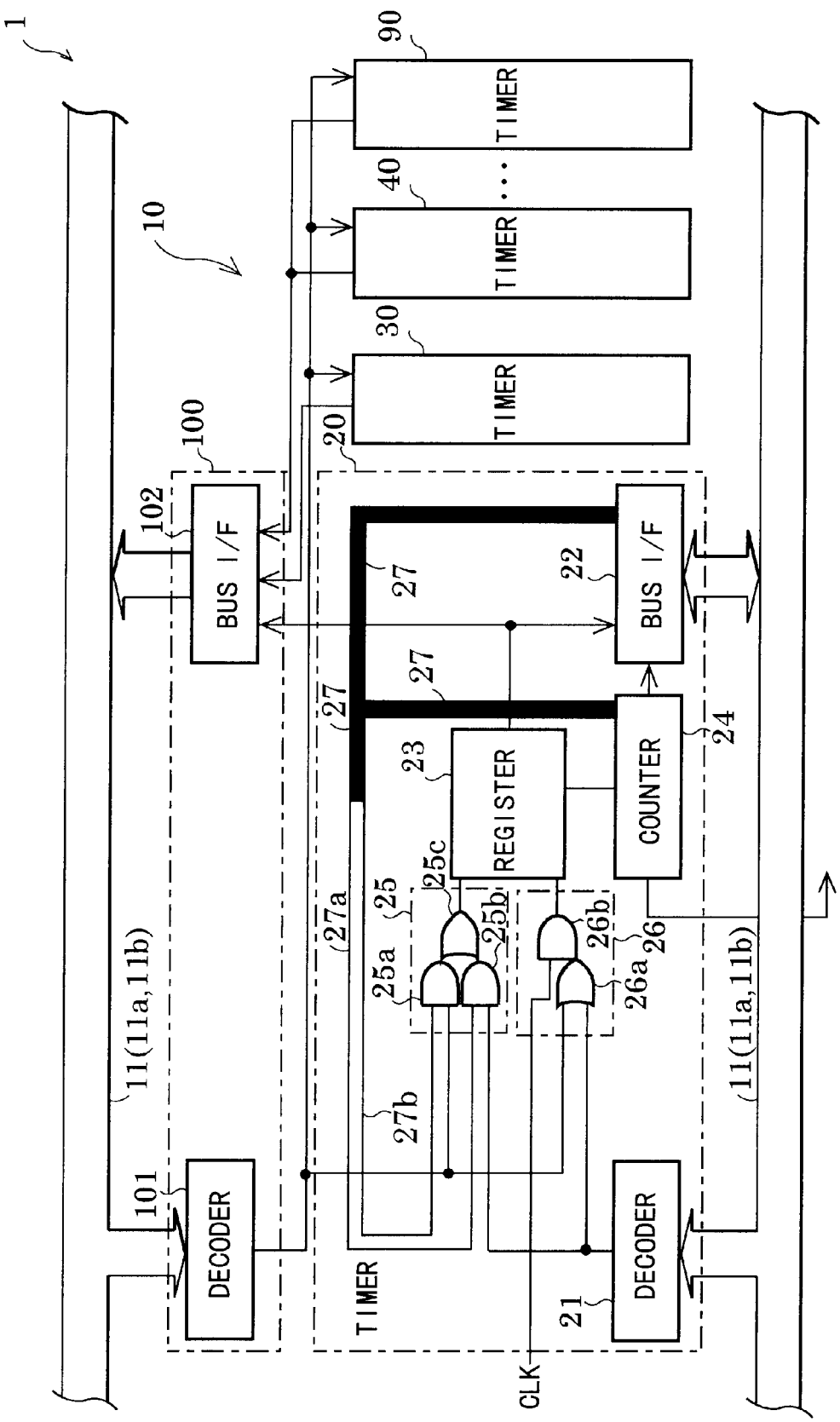
FIG. 1 is a block diagram of a timer apparatus of an embodiment 1.

FIG. 1 partially and schematically shows, for example, a circuit of a microcomputer in which a timer apparatus according to the invention is built.

In the example shown in the diagram, a timer apparatus 10 is provided in association with a bus 11 (11a, 11b) in an IC (integrated circuit) chip of a microcomputer 1. As is conventionally well-known, the bus 11 (11a, 11b) comprises a data bus 11a and an address bus 11b. The bus 11 (11a, 11b) is divided into two bus portions 11 and 11 for convenience of explanation and shown in FIG. 1.

To control a plurality of operating times of the microcomputer 1, for example, the timer apparatus 10 has a plurality of timers (20, 30, 40, 50, 60, 70, 80, and 90). A construction of the timer 20 is specifically illustrated in the diagram and a construction of each of the timers (30 to 90) having a construction similar to that of the timer 20 is omitted and is shown as a block.

The construction of the timer 20 will now be described.

In the example shown in the diagram, the timer 20 comprises: a first decoder 21 for receiving address information of a bit train in which each bit indicates a different operation command to the timer 20 through the address bus 11a from a CPU (not shown) provided in the IC chip and for decoding the address information of the bit train; a bus interface 22 for transmitting and receiving data that is necessary at the start of the operation of the timer 20, data showing the current operating state of the timer 20, and the like between the timer 20 and data bus 11b; a register 23 in which predetermined bit information among the bits of the bit train is written when the decoder 21 receives the address corresponding to the decoder, namely, the address information corresponding to the timer 20; and a counter 24 whose counting operation is controlled on the basis of an operation command, namely, bit information shown by the bit written in the The register 23 can be constructed by a flip-flop for, when an input of, for instance, a "1" signal is received at one input terminal, outputting, for example, a "0" signal or a "1" signal that is inputted to the other input terminal.

An address that is peculiar to the timer 20 is allocated to the first decoder 21 of the timer 20. When the decoder 21 receives an address signal, namely, address information which coincides with the address allocated to the decoder from the address bus 11a, the address information is decoded by the decoder 21 as is well-known hitherto.

In the example shown in FIG. 2A, each bit train to which the address information that is decoded by the decoder 21 is allocated consists of eight bits. In the example shown in the diagram, (0010) is allocated as an address peculiar to the timer 20, namely, as an address of the first decoder of the timer 20.

The bits (the zeroth bit (bit 0) to the seventh bit (bit 7)) of the bit train to which the address information (0010) peculiar to the timer 20 has been allocated indicate eight different operation commands to the timer 20. Among the bits of each bit train to which the address information peculiar to each timer has been allocated, the third bit (bit 3) as a bit of the fourth digit from the lowest digit indicates an operation command to the counter 24 of each timer, namely, the start or stop command of the operation of each counter 24.

The other bits of the bit train, namely, the zeroth bit (bit 0) to the second bit (bit 2) and the fourth bit (bit 4) to the seventh bit (bit 7) indicate, for example, commands to select a period of a clock CLK serving as a reference signal of the operation of the microcomputer.

Since the address of each timer has been given to the decoder 21 of each of the timers (20, 30, 40, 50, 60, 70, 80, and 90), when the first decoder 21 of each timer receives the address signal which coincides with the address allocated to the decoder, the address information is decoded by each decoder 21 as is well-known hitherto. By this decoding, when the address information which coincides with the address is received from the address bus 11a, the decoder 21 of each timer generates a decoding signal, for example a "1" signal.

The third bit of each bit train to which the peculiar address information corresponding to each timer has been given indicates an operation command to the counter of each timer.

Each of the timers (20, 30, 40, 50, 60, 70, 80, and 90) receives the bit information of the bit train corresponding to each address information from the data bus 11b through the bus interface 22.

When the third bit of each bit train which is received by each timer (20, 30, 40, 50, 60, 70, 80, and 90) is sequentially written into the register of each timer synchronously with the clock CLK through a bit selecting circuit 25 and a bit writing circuit 26 of each timer as will be explained in detail hereinlater, the operations of the timers (20, 30, 40, 50, 60, 70, 80, and 90) are sequentially controlled every period of the clock CLK.

The timer apparatus 10 according to the invention further has a bit train transmitting unit 100 for the purpose of simultaneous control of the operations of a plurality of timers (20, 30, 40, 50, 60, 70, 80, and 90).

The bit train transmitting unit 100 has: a second decoder 101 to which a peculiar address is allocated; and a bus interface 102 to transmit, for example, data showing an operating state of the register of each timer to the data bus 11*b*. When the address information allocated to the decoder is received, the second decoder 101 generates, for example, a "1" signal similar to that in each of the first decoder by the decoding.

Bit train data of a format shown in FIG. 2A or 2B and address data corresponding thereto are selectively transmitted from the CPU to the address bus 11*a* and data bus 11*b*. When the second decoder 101 of the bit train transmitting unit 100 receives the address data corresponding to the address of the decoder, namely, receives the address data of the bit train shown in FIG. 2B which is the bit train consisting of a plurality of bits and is the bit train in which each bit shows the operation command to the counter of the corresponding timer from the address bus 11*a*, the decoder 101 transmits a decoding signal to the bit selecting circuit 25 and bit writing circuit 26 of each timer. When the decoding signal is received from the bit train transmitting unit 100, the bit selecting circuit 25 and bit writing circuit 26 of each timer selectively writes the bit indicative of the operation command to the counter of each timer among the bits of the bit train which is transmitted through the bus interface 22 into the register of each timer.

As mentioned above, when the address information of the bit train to which the address peculiar to each decoder 21 has been allocated is received, the first decoder 21 of each timer (20, 30, 40, 50, 60, 70, 80, and 90) generates, for instance, a "1" signal as a decoding signal. As shown in FIG. 2A, the operation command of each timer is given to each bit train to which the address information of the first decoder 21 has been given. That is, the operation commands which are received by the decoders 21 have been distributed every bit train that is received by each decoder 21.

On the other hand, as shown in FIG. 2B, the bit train to which the address information that coincides with the address of the second decoder 101 provided in the bit train transmitting unit 100 is given is a bit train to which one address information consisting of a plurality of bits each of which gives the operation command of each timer has been given. That is, the operation commands of all of the timers have collectively been given to the bit train corresponding to the address of the decoder 101.

As mentioned above, the address information to each of the first decoders 21 and the address information to the second decoder 101 are selectively transmitted from the CPU to the address bus 11*a*. The bit train corresponding to each address information is transmitted from the CPU to the data bus 11*b* synchronously with each address information.

The bit indicative of the operation command of the register each timer differs in accordance with a discrimination result bout whether the data which is transmitted to the data bus 11*b* has been transmitted by the data train of the format shown in FIG. 2A or by the data train of the format shown in FIG. 2B.

That is, in the data train of the format shown in FIG. 2A, even in the register 23 of any timer, the operation command is located at bit 3. However, in the data train of the format shown in FIG. 2B, the bit positions of the operation commands are set to bit 0 to bit 7 every register of the timer.

To write a proper operation command corresponding to each register in accordance with the transmission format of the data or in accordance with the bit position of the operation command, the "1" signal is transmitted from the second decoder 101 of the bit train transmitting unit 100 or the first decoder 21 to the bit selecting circuit 25 and bit writing circuit 26 constructing the distribution writing circuit in the timer apparatus 10 according to the invention.

In the example shown in FIG. 1, the bit selecting circuit 25 of the timer 20 is constructed by: an AND circuit 25*a* for, when the bit train shown in FIG. 2B is transmitted to the data bus 11*b*, selecting the zeroth bit (bit 0) indicative of the operation command to the counter 24 among the bits of this bit train; an AND circuit 25*b* for, when the bit train shown in FIG. 2A is transmitted to the data bus 11*b*, selecting the third bit (bit 3) showing the operation command to the counter 24 among the bits of this bit train; and an OR circuit 25*c* for outputting the bit selected by the AND circuit 25*a* or AND circuit 25*b*.

One input terminal of the AND circuit 25*a* of the timer 20 is connected to an output terminal of the second decoder 101. The other input terminal of the AND circuit 25*a* of the timer 20 is connected to a first data line 27*b* to transmit the information of the zeroth bit (bit 0) among a plurality of data lines constructing the data bus 11*b*.

In the timers 30 to 90, although one input terminal of each AND circuit 25*a* is connected to the output terminal of the second decoder 101 in a manner similar to the case in the timer 20, the other input terminals of the AND circuits 25*a* are connected to second to eighth data lines (not shown) for transmitting the information of the first bit (bit 1) to the seventh bit (bit 7) among a plurality of data lines constructing the data bus 11*b*, respectively.

One input terminal of the AND circuit 25*b* of each timer (20, 30, 40, 50, 60, 70, 80, and 90) is connected to the output terminal of the first decoder 21 provided for each timer. The other input terminal of each of the AND circuits 25*b* of the timers (20, 30, 40, 50, 60, 70, 80, and 90) is connected to a fourth data line 27*a* to transmit the information of the third bit (bit 3) among a plurality of data lines constructing the data bus 11*b*.

Outputs of the AND circuits 25*a* and 25*b* are inputted to the register 23 of each timer through the OR circuit 25*c*.

In the example shown in the diagram, the bit writing circuit 26 of the timer 20 comprises an OR circuit 26*a* and an AND circuit 26*b* for setting a timing to write the bit showing the operation command to the counter 24 selected by the AND circuit 25*a* or 25*b* of the bit selecting circuit 25 from the OR circuit 25*c* of the bit selecting circuit 25 to the register 23.

One input terminal of the OR circuit 26*a* of each timer (20, 30, 40, 50, 60, 70, 80, and 90) is connected to the second decoder 101 and the other input terminal is connected to the first decoder 21 provided in each timer.

One input terminal of the AND circuit 26*b* of each timer (20, 30, 40, 50, 60, 70, 80, and 90) is connected to an output terminal of the OR circuit 26*a* and the clock CLK is inputted to the other input terminal.

Each register 23 comprises a flip-flop for generating the "1" signal or "0" signal as an output signal from the bit selecting circuit 25 to the counter 24 when, for example, the "1" signal from the bit writing circuit 26 is received.

When the first decoder 21 or second decoder 101 receives the address information corresponding to each address from the address bus 11*a*, the bit writing circuit 26 of each timer outputs a bit write signal "1" synchronized with the clock CLK to the register 23 of each timer. When the write signal "1" is received, the register 23 generates the output signal from the bit selecting circuit 25 to the register 23 synchronously with the write signal.

That is, for example, when the "1" signal in a binary signal is received from the bit writing circuit 26, for instance, if the "1" signal is received from the bit selecting circuit 25, each register 23 outputs the "1" signal indicative of the start command of the operation of the counter 24 to the register 23. When, for example, the "1" signal in the binary signal is received from the bit writing circuit 26, for instance, if the "0" signal is received from the bit selecting circuit 25, each register outputs the "0" signal showing the stop command of the operation of the counter 24 to the register 23.

An example of a control of the operation of each timer of the timer apparatus 10 under a situation where the bit train of the format shown in FIG. 2B has been transmitted to the bus 11 will now be described. In a situation where the bit train of the format shown in FIG. 2B has been transmitted to the data bus 11b, the address information of the bit train is transmitted to the address bus 11a synchronously with the bit train.

A control of the operation of the timer 20 will now be described as a representative of the control of the operation of each timer of the timer apparatus 10.

When the decoder 101 of the bit train transmitting unit 100 receives the address information corresponding to the bit train shown in FIG. 2B from the address bus 11a, the decoder 101 transmits the "1" signal to the AND circuit 25a of the bit selecting circuit 25 of the timer 20 and the OR circuit 26a of the bit writing circuit 26.

When the OR circuit 26a receives the "1" signal, the bit write signal "1" synchronized with the clock CLK is transmitted to the register 23 from the bit writing circuit 26 as mentioned above. By receiving the bit write signal "1", the output signal "1" or "0" from the bit selecting circuit 25 as an operation command to the counter 24 is written into the register 23 as mentioned above.

The operation command which is written into the register is data of the other data line 27b extending from the bus interface 22 through the AND circuit 25a which receives the "1" signal from the decoder 101.

As mentioned above, since the information of the zeroth bit showing the operation control of the timer 20 among the bits of the bit train shown in FIG. 2B has been transmitted to the data line 27b, the information of the zeroth bit indicative of the operation control of the timer 20 is written into the register 23 of the timer 20.

As mentioned above, when the "1" signal is inputted from the decoder 101 of the bit train transmitting unit 100 to the AND circuit 26b and the clock CLK is inputted to the AND circuit 26b, the write operation signal is outputted from the AND circuit 26b to the register 23 synchronously with the clock CLK.

When the operation signal synchronized with the clock CLK is outputted from the AND circuit 26b of the bit writing circuit 26 to the register 23, the zeroth bit indicative of the operation command to the counter 24 inputted to the OR circuit 25c of the bit selecting circuit 25 is outputted from the OR circuit 25c to the register 23 and is written therein. Since the zeroth bit is written into the register 23, the control of the start or stop of the operation of the counter 24, namely, the control of the operation of the timer 20 is performed.

As mentioned above, a construction of each of the other timers (30, 40, 50, 60, 70, 80, and 90) is similar to that of the timer 20 mentioned above except for a point that in place of the data line 27b of the timer 20, the data lines to which the bit information of the first to seventh bits corresponding to the timers is transmitted are connected to the other input terminals of the AND circuits 25a of the timers.

Therefore, the writing operation of each control information to the register 23 of each of the timers (30, 40, 50, 60, 70, 80, and 90) is executed simultaneously with the writing operation to the register 23 of the timer 20.

Consequently, when the decoder 101 of the bit train transmitting unit 100 receives the address information of the bit train showing the operation command of the timer to which one address information (001F) has been added and each bit differs, each bit showing the operation command of each timer of the bit train is simultaneously written into the register of each timer synchronously with the clock CLK by using the decoding signal from the decoder as a write permission signal. Thus, the operation control of the counter of each timer, namely, the operation controls of the timers (20, 30, 40, 50, 60, 70, 80, and 90) are simultaneously executed.

Consequently, in the timer apparatus 10 according to the invention, the operations of a plurality of timers (20, 30, 40, 50, 60, 70, 80, and 90) can be simultaneously controlled without adjusting the operations of the counters of the timers (20, 30, 40, 50, 60, 70, 80, and 90) in a software manner.

An example of controlling the operation of the timer 20 of the timer apparatus 10 by using both of the first decoder 21 and second decoder 101 according to the embodiment will now be described with reference to FIGS. 3A to 3D.

When the decoder 21 of the timer 20 receives the address information of the bit train shown in FIG. 2A indicative of the operation command of the timer 20 from the address bus 11a, the decoding signal is inputted from the decoder 21 to the AND circuit 25b of the bit selecting circuit 25 and the OR circuit 26a of the bit writing circuit 26.

In a manner similar to the case mentioned above, the third bit signal showing the operation command to each counter among the bits of each bit train is transmitted from the bus interface 22 to the AND circuit 25b of the bit selecting circuit 25 of each timer through the data line 27a.

That is, the data bus 11b extending from the bus interface 22 comprises the data lines corresponding to the bit trains of FIG. 2A and the bit signal corresponding to each bit is transmitted to each data line. The data line 27a transmits the third bit signal. Since the data line 27a to transmit the third bit signal is connected to the other input terminal of the AND circuit 25b as mentioned above, the third bit signal is inputted to the other input terminal of the AND circuit 25b. The decoding signal from the decoder 21 is inputted to the one input terminal of the AND circuit 25b. Thus, when the decoder 21 receives a predetermined address signal corresponding to the address of the relevant decoder, the third bit among the bits of the bit train is selected by the AND circuit 25b. Consequently, the bit information is written into the register 23 synchronously with the clock CLK as mentioned above.

More specifically speaking in the AND circuit 25b of the bit selecting circuit 25, as shown in FIG. 3A, when the decoder 21 receives the address signal of the bit train including the bit information "1" showing the start command of the operation of the counter 24, for example, as a third bit (bit 3) of the bit train at time t1 and the third bit signal to select the third bit among the bits of the bit train is inputted from the bus interface 22 to the AND circuit 25b through the data line 27a, the bit information "1" showing the operation start command is outputted from the AND circuit 25b to the OR circuit 25c.

The bit information "1" of the third bit inputted to the OR circuit 25c of the bit selecting circuit 25 is written into the register 23 as shown in FIG. 3C synchronously with the clock CLK which is inputted to the AND circuit 26b of the bit writing circuit 26, so that the counting operation of the counter 24, namely, the operation of the timer 20 is started as shown in FIG. 3D.

After that, the bit train data and the address data corresponding thereto which are transmitted to the data bus 11a and address bus 11b are switched to the format shown in FIG. 2B. The decoder 101 of the bit train transmitting unit 100 receives the address information corresponding to the decoder at time t2 as shown in FIG. 3B. In the example shown in FIG. 3B, the counter operation command for the timer 20 in this instance, namely, the zeroth bit of the bit train is bit information "0" showing the stop command of the operation of the counter 24.

When the decoder 101 receives the address information at time t2, as shown in FIG. 3C, the bit information "0" of the zeroth bit is written into the register 23, so that the counting operation of the counter 24, namely, the operation of the timer 20 is stopped as shown in FIG. 3D.

After that, as shown in FIG. 3B, when the decoder 101 of the bit train transmitting unit 100 receives, for example, the address signal of the bit train as shown in FIG. 2B including the bit information "1" indicative of the start command of the operation of the counter 24 at time t3, the bit information "1" of the zeroth bit is again written into the register 23 as shown in FIG. 3C, so that the counting operation of the counter 24 is started as shown in FIG. 3D.

Further, when the bit train data and the address data corresponding thereto which are sent to the data bus 11a and address bus 11b are switched to the format shown in FIG. 2A and the decoder 21 of the timer 20 receives the address signal of the bit train including the bit information "0" indicative of the stop command of the operation of the counter 24 as a third bit (bit 3) of the bit train at time t4 as shown in FIG. 3A, the bit information "0" showing the stop command of the operation of the counter 24 is written into the register 23 as a third bit of the bit train as shown in FIG. 3C. Thus, the counting operation of the counter 24 is stopped as shown in FIG. 3D as is well-known hitherto.

As mentioned above, in the timer apparatus 10 of the embodiment 1, in addition to permitting operation commands to the timers (20, 30, 40, 50, 60, 70, 80, and 90) to be simultaneously written into the register of each timer, operation commands to the counters on the basis of address information peculiar to each timer can be sequentially written into the register of each timer.

According to the timer apparatus 10 of the invention, the operations of a plurality of timers can be simultaneously controlled without needing a software-like adjustment as in the conventional timer apparatus and the conventional timer function can be given to the timer apparatus.

Embodiment 2

Figure 4:
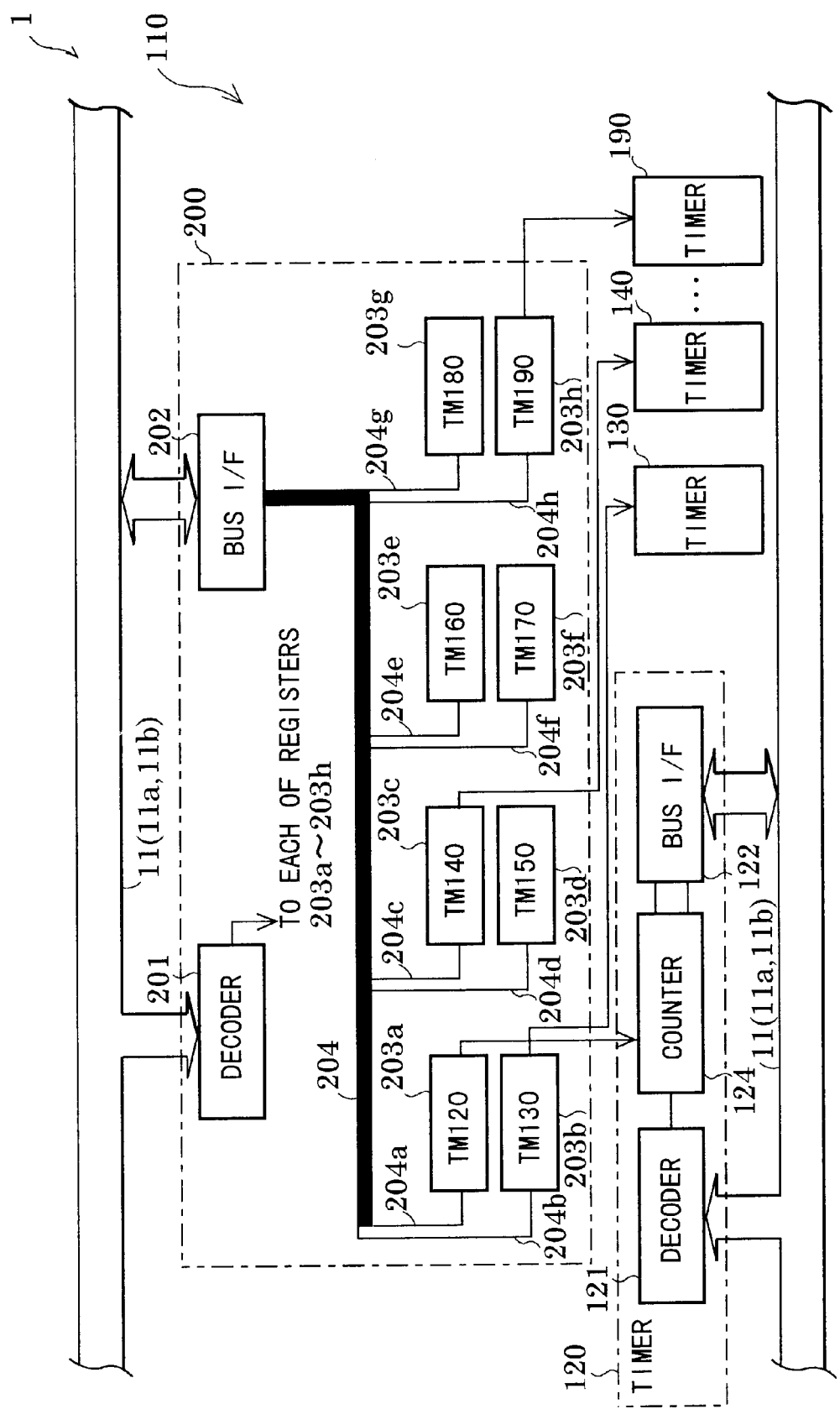
FIG. 4 is a block diagram of a timer apparatus of an embodiment 2.

FIG. 4 shows a block diagram of a timer apparatus of an embodiment 2.

In the embodiment 1, an example of the distribution writing circuit having the bit selecting circuit 25 and bit writing circuit 26 provided for every timer is shown.

On the other hand, in a timer apparatus 110 of the embodiment 2 shown in FIG. 4, an example of a distribution writing circuit having a data bus 204 comprising data lines to individually transmit each bit of the bit train is shown.

In the example shown in the diagram, the data bus 204 comprises, for instance, eight data lines (204a, 204b, 204c, 204d, 204e, 204f, 204g, and 204h) each corresponding to each bit of the bit train.

Registers (203a, 203b, 203c, . . . , 203h) corresponding to timers (120, 130, 140, . . . , 190) of the timer apparatus 110 are collectively provided in a bit train transmitting unit 200 in the example shown in the diagram.

A decoder 121, a counter 124, and a bus interface 122 similar to the conventional ones are provided for each timer in correspondence to the decoder 21, counter 24, and bus interface 22 shown in FIG. 1.

When address information added to a bit train which corresponds to an address allocated to the decoder and is similar to that shown in FIG. 2B is received, a decoder 201 generates a decoding signal similar to that mentioned above. The registers corresponding to the timers are connected to the decoder 201 at one input terminal of each register so as to be in parallel with one another so as to simultaneously receive the bit train from the decoder 201.

A bus interface 202 is connected to the data bus 11b and receives a bit train signal which has as many bits as the number of registers of the timer apparatus 10 and is similar to that shown in FIG. 2B.

The data bus 204 is extended from the bus interface 202. The data bus 204 comprises the data lines (204a, 204b, 204c, 204d, 204e, 204f, 204g, and 204h) to lead operation signals to the registers (203a, 203b, 203c, 203d, 203e, 203f, 203g, and 203h) of the timers 120 to 190, respectively. The data lines (204a to 204h) are connected to the other input terminals of the registers (203a to 203h) of the corresponding timers 120 to 190, respectively.

As mentioned above, when the decoder 201 receives the address signal of the bit train shown in FIG. 2B, the registers (203a to 203h) receive the decoding signal from the decoder. The registers (203a to 203h) simultaneously receive the bits corresponding to the registers of the bit train through the corresponding data lines (204a to 204h), respectively.

When the decoding signal, for example, the "1" signal is received from the decoder 201, the registers (203a to 203h) which receive outputs from the decoder 201 and bus interface 202 at input terminals simultaneously output operation signals of the counter 124 of each timer corresponding to each bit of the bit train to the corresponding counters 124 through the data lines (204a to 204h) extending from the bus interface 202 to the registers.

That is, when each register (203a to 203h) receives the decoding signal "1" from the decoder, if it is the "1" signal showing the command, for example, the operation start command according to the data of each of the corresponding data lines (204a to 204h), the "1" signal indicative of the operation start command is outputted to the corresponding counter 124. If the decoding signal is the "0" signal showing the operation stop command, the "0" signal indicative of the operation stop command is outputted to the corresponding counter 124.

Thus, the operations of the counters 124 of the timers are simultaneously controlled in response to the commands of the bits of the data lines.

An example of controlling the operation of the timer 120 of the timer apparatus 110 will now be described with reference to FIGS. 5A to 5C.

When the decoder 201 of the bit train transmitting unit 200 receives the address information of the bit train showing the operation command of each timer at time t11 from the address bus 11a as shown in FIG. 5A in a manner similar to the case described in the embodiment 1, the decoding signal is sent from the decoder 201 to the registers 203a to 203h corresponding to the timers 120, so that the register 203a corresponding to the timer 120 receives the decoding signal.

The zeroth bit signal (operation start command "1" in the example shown in FIG. 5A) among the bits of the bit train from the bus interface 202 is sent to the register 203a through the data line 204a from the bus interface 202 as mentioned above.

The bit information "1" of the zeroth bit sent to the register 203a through the data line 204 is written into the register 203a as shown in FIG. 5A since the register 203a receives the decoding signal, so that the bit information "1" is outputted from the register 203a to the counter 124.

When the counter 124 of the timer 120 receives the bit information "1" of the zeroth bit, the counting operation of the counter 124, namely, the operation of the timer 120 is started as shown in FIG. 5C.

When the decoder 201 of the bit train transmitting unit 200 receives the address information of the bit train indicative of the operation command of each timer from the address bus 11a at time t12 as shown in FIG. 5A (operation stop command "0" in the example shown in FIG. 5A), the register 203a corresponding to the timer 120 receives the decoding signal in a manner similar to the case mentioned above.

As mentioned above, the zeroth bit signal (operation stop command "0") among the bits of the bit train from the bus interface 202 is sent from the bus interface 202 to the register 203a through the data line 204a. By receiving the decoding signal, as shown in FIG. 5A, the operation stop command "0" as bit information which is transmitted through the data line 204a is written into the register 203.

Therefore, the data bus 204 comprising the data lines (204a, 204b, 204c, 204d, 204e, 204f, 204g, and 204h) constructs the distribution writing circuit together with the decoder 201.

When the bit information "0" is written into the register 203a by the distribution writing circuit, the bit information "0" is outputted from the register 203a and is inputted to the counter 124.

When the bit information "0" of the zeroth bit is received by the counter 124 of the timer 120, the counting operation of the counter 124, namely, the operation of the timer 120 is stopped as shown in FIG. 5C.

In the timer apparatus 110 of the embodiment 2, since the bit selecting circuit 25 and bit writing circuit 26 provided for the timer apparatus 10 of the embodiment 1 are unnecessary, the timer apparatus can be miniaturized.

According to the timer apparatus of the invention, as mentioned above, since the same address has been allocated to the operation command to each counter, the operation command to each counter can be simultaneously written into each register, so that the operations of a plurality of timers can be simultaneously controlled without adjusting the operation of the counter of each timer in a software manner.

According to the timer apparatus of the invention, therefore, since there is no need to form software to adjust the operations of the counters of the timers, the operations of a plurality of timers can be relatively easily simultaneously controlled.

The present invention is not limited to the foregoing embodiments but many modifications and variations are possible within the spirit and scope of the appended claims of the invention.

What is claimed is:

1. A timer apparatus comprising:

a plurality of counters;

a register, provided in correspondence to each of said counters, for writing an operation command to each of said counters; and a distribution writing circuit for simultaneously writing each of said operation commands at bit positions corresponding to said counters of a bit train into each of said registers corresponding to each of said counters in order to control an operation of each of said counters when receiving said bit train which consists of a plurality of continuous bits to which one address information has been added and in which each of said bits indicates the operation command to said counter corresponding to each of the bit positions, wherein operation commands to the timers can be simultaneously written into the register of each timer, and additionally, operation commands to the counters to which address information peculiar to each timer has been given can be sequentially written into the register of each timer.

2. An apparatus according to claim 1, further comprising a decoder to which an address corresponding to said address information is allocated and which transmits a decoding signal to said distribution writing circuit so as to give a write permission to said register to said distribution writing circuit when said address information corresponding to said address is received.

3. An apparatus according to claim 1, wherein said register is a flip-flop for, when a predetermined input signal is received at an input terminal, outputting a signal which is inputted to another input terminal.

4. An apparatus according to claim 1, wherein said distribution writing circuit has a bit selecting circuit which is provided in correspondence to each of said counters and outputs a bit signal to said counter when said bit corresponding to said counter of said bit train is received.

5. An apparatus according to claim 4, wherein said distribution writing circuit has a writing circuit which is provided for each of said counters and is used to write the bit signal outputted from said bit selecting circuit to said register of said counter corresponding to said bit signal.

6. An apparatus according to claim 5, wherein each of said distribution writing circuits simultaneously outputs an operation signal to each of said registers so as to enable said bit which is outputted from said bit selecting circuit to be simultaneously written into each of said registers.

7. A timer apparatus comprising:

a plurality of counters;

a register, provided in correspondence to each of said counters, for writing an operation command to each of said counters; and a distribution writing circuit for simultaneously writing each of said operation commands at bit positions corresponding to said counters of a bit train into each of said registers corresponding to each of said counters in order to control an operation of each of said counters when receiving said bit train which consists of a plurality of continuous bits to which one address information has been added and in which each of said bits indicates the operation command to said counter corresponding to each of the bit positions, wherein said distribution writing circuit has: a decoder to which an address corresponding to said address information is allocated and which transmits a decoding signal to each of said registers so as to give a write permission to said register when said address information corresponding to said address is received; and a data bus comprising data lines which are provided in correspondence to the bits of said bit train and are used to transmit a bit signal at said bit position of said bit train corresponding to each of said counters to each of said corresponding counters, and said command is written into each of said registers by asynchronous inputs of said decoding signal from said decoder and the bit signal from said data line.

8. An apparatus according to claim 7, further comprising a decoder to which an address corresponding to said address information is allocated and which transmits a decoding signal to said distribution writing circuit so as to give a write permission to said register to said distribution writing circuit when said address information corresponding to said address is received.

9. An apparatus according to claim 7, wherein said register is a flip-flop for, when a predetermined input signal is received at an input terminal, outputting a signal which is inputted to another input terminal.

10. An apparatus according to claim 7, wherein said distribution writing circuit has a bit selecting circuit which is provided in correspondence to each of said counters and outputs a bit signal to said counter when said bit corresponding to said counter of said bit train is received.

11. An apparatus according to claim 10, wherein said distribution writing circuit has a writing circuit which is provided for each of said counters and is used to write the bit signal outputted from said bit selecting circuit to said register of said counter corresponding to said bit signal.

12. An apparatus according to claim 11, wherein each of said distribution writing circuits simultaneously outputs an operation signal to each of said registers so as to enable said bit which is outputted from said bit selecting circuit to be simultaneously written into each of said registers.

13. A timer apparatus comprising:
a plurality of timers, each comprising a counter and having an address;
means for addressing each timer individually and for providing an operation command to the counter thereof; and
means for addressing all of the counters simultaneously and for providing operation commands to the counters of the timers,
wherein the means for addressing each timer individually comprises a plurality of first address decoders, each first address decoder being included in a respective timer, and
wherein the means for addressing all of the timers simultaneously comprises; a second address decoder that is connected to each of the timers.

14. An apparatus according to claim 13, wherein the operation commands are stop/run commands that are supplied to the timers via a bus.

15. An apparatus according to claim 13, wherein each timer further comprises a register that is connected to the counter of the respective timer, and a logic circuit that supplies input signals to the register, the logic circuit being connected to the first decoder of the respective timer and to the second decoder.

16. An apparatus according to claim 15, wherein the register is a one-bit register.

17. An apparatus according to claim 16, wherein the logic circuit comprises a bit selecting circuit having input terminals that are connected to the first decoder of the respective timer and to the second decoder, and a bit writing circuit having input terminals that are connected to the first decoder of the respective timer and to the second decoder.

18. An apparatus according to claim 17, wherein the bit writing circuit additionally has an input terminal for receiving a clock signal.

* * * * *